United States Patent [19]

Löbach et al.

[11] 4,250,112
[45] Feb. 10, 1981

[54] POLYALKYLENEPOLYAMINES CONTAINING QUATERNARY DIALKYLAMMONIUM GROUPS

[75] Inventors: Wilfried Löbach, Bonn; Wolfgang Lehmann, Leverkusen; Friedhelm Müller, Odenthal, all of Fed. Rep. of Germany

[73] Assignee: Bayer Aktiengesellschaft, Leverkusen, Fed. Rep. of Germany

[21] Appl. No.: 37,007

[22] Filed: May 8, 1979

[30] Foreign Application Priority Data

May 10, 1978 [DE] Fed. Rep. of Germany ....... 2820488

[51] Int. Cl.³ ............................................. C07C 91/12
[52] U.S. Cl. .................................. 564/291; 210/928; 564/292; 564/295; 544/401
[58] Field of Search ................. 260/567.6 P, 567.6 M; 528/158, 156

[56] References Cited

U.S. PATENT DOCUMENTS

| | | | |
|---|---|---|---|
| 4,054,542 | 10/1977 | Buckman et al. | 260/567.6 P |
| 4,087,247 | 5/1978 | Petzold et al. | 260/567.6 P |
| 4,089,977 | 5/1978 | Green et al. | 260/567.6 P |
| 4,156,775 | 5/1979 | Evani et al. | 260/567.6 P |

Primary Examiner—James H. Reamer
Attorney, Agent, or Firm—Sprung, Felfe, Horn, Lynch & Kramer

[57] ABSTRACT

Water-soluble polyalkylenepolyamines which are not self-crosslinking and contain quaternary dialkylammonium groups, and which are obtained by reaction of polyalkylenepolyamines of the general formula

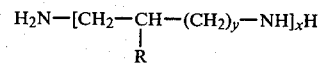

in which
R denotes hydrogen or methyl,
y denotes the number 0 or 1 and the y's may be identical or different and
x denotes a number from 2 to 15,
with bifunctional compounds of the general formula

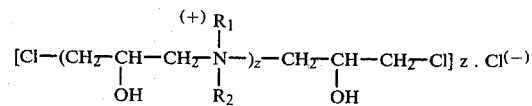

in which
z denotes a number from 1 to 6 and
$R_1$ and $R_2$ denote lower alkyl or lower hydroxyalkyl, are suitable for use as auxiliaries in the manufacture of paper.

5 Claims, No Drawings

POLYALKYLENEPOLYAMINES CONTAINING QUATERNARY DIALKYLAMMONIUM GROUPS

The invention relates to water-soluble polyalkylenepolyamines which are not self-crosslinking and contain quaternary dialkylammonium groups, and which are prepared by reaction of polyalkylenepolyamines of the general formula $$H_2N-[CH_2-CH(R)-(CH_2)_y-NH]_x-H \qquad I$$

in which

R denotes hydrogen or methyl, y denotes the number 0 or 1 and the y's may be identical or different and x denotes a number from 2 to 15, with the compounds of the general formula $$[Cl-(CH_2-CH(OH)-CH_2-\overset{(+)}{\underset{R_2}{N}}(R_1)_z-CH_2-CH(OH)-CH_2-Cl]\ z\cdot Cl^{(-)} \qquad II$$

in which z denotes an integer from 1 to 6 and $R_1$ and $R_2$ denote lower alkyl or lower hydroxyalkyl.

The invention further relates to a process for the preparation of these polyalkylenepolyamines and to their use as agents for increasing the retention of fibres, fillers and pigments as well as for acceleration of drainage in the manufacture of paper, and for the working up of papermaking machine waste waters by filtration, sedimentation and flotation.

The new polyalkylenepolyamines can also be prepared by reaction of mixtures of the amines I with amines of the same formula, in which x denotes the number 1, for example ethylenediamine or propylene-1,2-diamine.

Polyalkylenepolyamines of the formula I to be mentioned above all are the polyethylenepolyamines in which y represents zero, for example diethylenetriamine, dipropylenetriamine, triethylenetetramine, tripropylenetetramine, tetraethylenepentamine, tetrapropylenepentamine, pentaethylenehexamine, pentapropylenehexamine, hexaethyleneheptamine, hexapropyleneheptamine, heptaethyleneoctamine, heptapropyleneoctamine, pentaethylenepentamine, octaethyleneheptamine and their mixtures, but especially (1) the polyethylenepolyamine mixture obtained on discontinuous reaction (for example Houben-Weyl, 4th edition, XI/1, page 44) or continuous reaction (for example British Pat. No. 1,147,984 and U.S. Pat. Nos. 1,832,534 and 2,049,467) of 1,2-dichloroethane with aqueous ammonia, optionally in the presence of added ethylenediamine or diethylenetriamine (U.S. Pat. No. 2,769,841 and German Offenlegungsschrift (German Published Specification) No. 1,668,922), which contains substantial proportions of tetraethylenepentamine, pentaethylenehexamine, hexaethylenehexamine, hexaethyleneheptamine, heptaethylenehexamine, heptaethyleneheptamine, heptaethyleneoctamine and higher amines and, in addition, small amounts of cyclic amines such as N-ethyl-piperazine. For example, 6–30 mols of ammonia are used in the reaction per mol of 1,2-dichloroethane, (2) the polyethylenepolyamine mixture which is left after distilling off ethylenediamine, and optionally also diethylenetriamine, from the base mixture prepared according to (1), (3) the polyethylenepolyamine mixture which is left after distilling off triethylenetetramine from the base mixture prepared according to (2), (4) the polyethylenepolyamine mixture which is left after distilling off tetraethylenepentamine from the base mixture prepared according to (3), and (5) the polyethylenepolyamines obtained by polymerisation of 1,2-alkyleneimines.

The following should also be mentioned as further polyalkylenepolyamines A (6) pure polypropylenepolyamines and their mixtures, (7) mixed polyethylenepolypropylenepolyamines and their mixtures, above all those obtained by reacting ethylenediamine and propylene-1,3-diamine once or several times with acrylonitrile and in each case subsequently hydrogenating the product, for example the polyfunctional amines of the formula $$H_2N-[CH_2-CH_2-CH_2-NH]_m-H \qquad (III)$$

wherein m denotes an integer from 2 to 10, as well as those of the formula $$H[HN-CH_2-CH_2-CH_2]_n-NH-CH_2-CH_2-NH-[CH_2-CH_2-CH_2-NH]_oH \qquad (IV)$$

wherein n denotes a number from 1 to 5 and o denotes a number from 0 to 5.

Furthermore, the polyamines I mixed with amines of the formula $$Y+(CH_2-CHR_3-CH_2-NH)_p-H]_q \qquad (V)$$

in which

Y represents oxygen, sulphur or the radical of an at least difunctional aliphatic, cycloaliphatic, araliphatic or aromatic compound containing hydroxyl groups and/or sulphhydryl groups, $R_3$ denotes hydrogen or the methyl group, p denotes an integer which is at least 1, preferably 1-3, and q denotes an integer which is at least 2, preferably 2-4, can be converted to the products according to the invention.

Representative examples of the polyamines V are bis-(3-amino-propyl) ether, bis-(3-aminopropyl) sulphide, ethylene glycol bis-(3-amino-propyl ether), dithioethylene glycol bis-(3-aminopropyl ether), neopentylene glycol bis-(3-amino-propyl ether) and hydroquinone bis-(3-amino-propyl ether), as well as amines of the formula $$R_4N\begin{cases}(CH_2-CH(R_5)-CH_2-NH)_rH\\(CH_2-CH(R_6)-CH_2-NH)_sH\end{cases} \qquad (Va)$$

in which $R_4$ represents a $C_1$–$C_{18}$-alkyl radical which is optionally substituted by an amino or hydroxyl group, $R_5$ and $R_6$ independently of one another represent hydrogen or a methyl group and r and s are a number from 1 to 20, preferably from 2 to 5.

Representative examples of the amines Va are ethyl-bis-(3-aminopropyl)-amine, 2-hydroxy-ethyl-bis-(3-amino-propyl)-amine, n-butyl-bis-(3-amino-propyl)-amine, tris-(3-aminopropyl)-amine and methyl-bis-(3-amino-propyl)-amine.

The compounds II, which hereafter are also referred to as crosslinking agents, are known compounds (German Offenlegungsschrift (German Published Specification) No. 1,795,392). They can be obtained by reaction of HCl, epichlorohydrin and secondary amines in accordance with the following equation

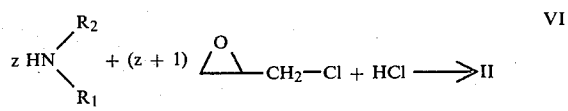

In this equation, $R_1$ and $R_2$ have the same meaning as in formula II. In particular, they represent $C_1$–$C_3$-alkyl or hydroxyethyl.

Above all, dimethylamine is used as the amine VI.

Further suitable amines are diethylamine and diethanolamine.

Previously known processes for the preparation of high-molecular polyalkylenepolyamines are the following:

The reaction of polyalkylenepolyamines with dihaloethane and dihalopropane in an aqueous medium (British Pat. No. 775,721), the reaction of polyalkylenepolyamines with epihalohydrins or dihalohydrins in an aqueous medium (U.S. Pat. No. 2,969,302) and the reactions of polyethylenepolyamines with 1,2-dichloroethane to give highly viscous aqueous solutions (900 mPas at 25° C.), followed by thermal reduction of the viscosity to 300–600 mPas (German Pat. No. 2,351,754).

The compounds II have hitherto been used in the preparation of high-molecular polyamidoamines (German Offenlegungsschrift (German Published Specification) No. 1,795,392) and high-molecular polyetheramines (German Offenlegungsschrift (German Published Specification) No. 2,127,082).

The polyalkylenepolyamines according to the invention differ from the previously known polyalkylenepolyamines in that they possess from the start, as free bases, a number of quaternary alkylated nitrogen atoms corresponding to the proportion of the crosslinking agent incorporated.

Even solutions of relatively low viscosity (25% strength solutions, 200–250 mPas at 25° C.) of the polyalkylenepolyamines according to the invention exhibit, in the basic and acid ranges, a better activity than those prepared according to the state of the art.

The preparation according to the invention is in particular carried out in aqueous solution. The reaction temperatures are about 0°–100° C., especially about 50°–80° C. Per mol of basic nitrogen, 0.1–0.5 mol, but especially 0.15–0.4 mol, of the crosslinking agent is employed. The pH value of the reaction is above 6, in particular 8–11. The amount of crosslinking agent should be such that soluble polyalkylenepolyamines are just still formed and should preferably be between 80 and 98%, if the amount which just still gives soluble products is described as 100%. If the amount is too large, water-insoluble products are obtained, which lie outside the process according to the invention.

The right amount at which as yet no water-insoluble products are formed can easily be determined in each case by preliminary experiments.

The alkylation reactions of the crosslinking agent can be frozen by acidification to pH values between 2 and 6, preferably 3.5–5.5, and even if the crosslinking agent has not reacted completely, solutions which are stable on storage can be obtained if an overdose is present.

In using the polyalkylenepolyamines according to the invention as auxiliaries for increasing the retention of fibres, fillers and pigments, and as drainage accelerators, the procedure followed, in a manner which is in itself known, is that the polyalkyleneamines according to the invention are added in the form of dilute aqueous solutions to the paper raw material suspension before the headbox, the point of addition being selected so as to ensure good distribution of the auxiliary in the raw material suspension, but to avoid an excessively long contact time. The amounts of polyalkylenepolyamines which are required to achieve the desired retention effect and/or drainage acceleration effect can be determined without difficulty by preliminary experiments; in general it is advisable to use 0.005 to 0.5 percent by weight of polyalkylenepolyamines, relative to the dry weight of the paper. The addition of polyamines according to the invention before the headbox of a papermaking machine furthermore has an advantageous effect when working up the papermaking machine waste waters by filtration, flotation or sedimentation; the coagulating action of the polyamines according to the invention very substantially facilitates the removal of paper pulp constituents from the papermaking machine waste water.

When using the polyalkylenepolyamines according to the invention as auxiliaries for working up of papermaking machine waste waters by filtration, flotation or sedimentation, it is again possible to proceed in a manner which is in itself known, preferably by adding the reaction products in question, in the form of dilute aqueous solutions, to the papermaking machine waste water, advantageously before it enters the save-all.

The amounts of polyalkylenepolyamines which produce adequate coagulation of the paper raw material constituents contained in papermaking machine waste waters must be chosen in accordance with the composition of the waste waters and can easily be determined from case to case by preliminary experiments; in general, amounts of 0.005 to 2 g of polyamine per $m^3$ of waste water are sufficient for this purpose.

Surprisingly, the polyalkylenepolyamines according to the invention exhibit, particularly in a neutral or weakly alkaline medium, an increase in acceleration of drainage in the manufacture of paper, and an increase in the retention action, compared to the previously known polyalkylenepolyamines.

The polyalkylenepolyamines which can be synthesised from the low-molecular polyethylenepolyamine mixtures described under (2) (3) and (4) have proved particularly effective. Preferably, 0.15–0.38 mol of crosslinking agent is employed per mol of nitrogen in these cases.

Some of the polyalkylenepolyamines according to the invention, and their use for increasing the retention of fibres, fillers and pigments, and for accelerating the drainage in the manufacture of paper, are described below by way of examples.

PREPARATION EXAMPLES

Preparation and composition of the polyalkylenepolyamines I

Polyalkylenepolyamine (a)

First, the excess ammonia is removed, under pressure, from the reaction mixture obtained by continuous reaction of dichloroethane, aqueous ammonia and ethylenediamine in the molar ratio of 1:17:0.4 at 160°–220° C. and 100 bar, and thereafter the resulting bases are liberated from their hydrochlorides at 130°–135° C. by means of excess 50% strength sodium hydroxide solution. In doing so, the greater part of the water and the ethylenediamine distils off, whilst the higher-boiling bases separate out as liquids. The base mixture thus obtained contains in addition to 15–20% of water and 3–5% of ethylenediamine, about 15–20% of diethylenetriamine, 2–3% of aminoethylenepiperazine, 1% of $NH_2-CH_2CH_2-NHCH_2CH_2-OH$, 15–18% of triethylenetetramine, 3–4% of tetraethylenetetramine, 10–14% of tetraethylenepentamine, 6–10% of pentaethylenehexamine and about 10–15% of higher polyethylenepolyamines, as well as small amounts of sodium chloride and sodium hydroxide.

Polyalkylenepolyamine (b)

The residual water, ethylenediamine and the greater part of the diethylenetriamine are distilled from the base mixture, obtained according to (a), first under normal pressure and then under reduced pressure of about 100 mbar, and the sodium chloride which separates out is removed by filtration.

Polyalkylenepolyamine (c)

In addition to water, ethylenediamine and diethylenetriamine, the greater part of the triethylenetetramine is also removed from the base mixture, obtained according to (a), by distillation under a final vacuum of about 10–15 mm Hg, and the inorganic materials which separate out are again removed by filtration; the filtration is facilitated by adding kieselguhr, and the amine mixture can furthermore be substantially brightened by using active charcoal.

Polyalkylenepolyamine (d)

In addition to water, ethylenediamine, diethylenetriamine and triethylenetetramine, the greater part of the tetraethylenepentamine is also removed from the base mixture, obtained according to (a), by distillation under a final vacuum of about 10–15 mm Hg, and the inorganic materials which separate out are again removed by filtration; the filtration is facilitated by adding kieselguhr, and the amine mixture can furthermore be substantially brightened by using active charcoal.

Polyalkylenepolyamine (e)

The mixture of $H_2N-CH_2-CH_2-CH_2-NH-CH_2-CH_2-NH_2$ and $H_2N-CH_2-CH_2-CH_2-NH-CH_2-CH_2-NH-CH_2-CH_2-CH_2-NH_2$ which has been obtained by reaction of ethylenediamine with 1.5 mols of acrylonitrile and subsequent hydrogenation, is reacted with 2 mols of acrylonitrile and then hydrogenated.

Preparation of the polyalkylenepolyamines according to the invention:

EXAMPLE (1)

23.9 g of the polyalkylenepolyamine mixture described under (d), having a base equivalent of 47.8, are initially introduced into 50 g of water in a 3-neck flask. 100 g of aqueous 50% strength solution of a crosslinking agent, which has been prepared in accordance with German Offenlegungsschrift (German Published Specification) No. 1,795,397 from 2 mols of dimethylamine, 3 mols of epichlorohydrin and 1 mol of HCl, are then added. The reaction solution is stirred at 55° C. until a viscosity of 200 mPas at 55° C. is reached. The reaction is diluted with 60 g of water and stirring is continued at 55° C. until the viscosity reached is such that a 25% strength solution of pH 4 gives a viscosity of about 400 mPas at 25° C. The mixture is then cooled and sufficient water and concentrated hydrochloric acid are added that a 25% strength solution of pH 4 results (free polyalkylenepolyamine base without HCl). The viscosity is 390 mPas.

EXAMPLE (2)

21.9 g of the polyalkylenepolyamine mixture described under (c), having a base equivalent of 43.8, are initially introduced into 40 g of water in a 3-neck flask. 53 g of aqueous 76.5% strength solution of a crosslinking agent, which has been prepared in accordance with German Offenlegungsschrift (German Published Specification) No. 1,795,392 from 3 mols of dimethylamine, 4 mols of epichlorohydrin and 1 mol of HCl, are then added, and the reaction solution is stirred at 55° C. until a viscosity of 200 mPas at 55° C. is reached. The mixture is then diluted with 30 g of water and stirring is continued at 55° C. until the viscosity reached is such that when the mixture is brought to 25% strength and a pH value of 4, a viscosity of about 250 mPas at 25° C. results. Sufficient water and concentrated hydrochloric acid are then added that a 25% strength solution of pH 4 results (free polyalkylenepolyamine base without HCl). The viscosity is 270 mPas.

EXAMPLE (3)

23.9 g of the polyalkylenepolyamine mixture described under (d), having a base equivalent of 47.8, are initially introduced into 50 g of water in a three-neck flask. 51 g of aqueous 77% strength solution of a crosslinking agent, which has been prepared in accordance with German Offenlegungsschrift (German Published Specification) No.1,795,342 from 4 mols of dimethylamine, 5 mols of epichlorohydrin and 1 mol of HCl, are then added, and the reaction solution is stirred at 80° C. until a viscosity of 100 mPas is reached. The mixture is then diluted with 40 g of water and is stirred at 70° C. until the viscosity reached is such that when the mixture is brought to 25% strength and a pH value of 4, a viscosity of about 350 mPas at 25° C. results. Sufficient water and concentrated hydrochloric acid are then added that a 25% strength solution of pH 5 results (free polyalkylenepolyamine base without HCl). The viscosity is 355 mPas.

EXAMPLE (4)

25.5 g of the polyalkylenepolyamine mixture described under (e), having a base equivalent of 51, and 20 g of water are initially introduced into a three-neck flask. 80 g of the crosslinking agent used in Example 1 are then added and the mixture is stirred at 50° C. until a viscosity of 100 mPas is reached. The mixture is then diluted with 40 g of water and stirred at 55° C. until the viscosity reached is such that when the mixture is brought to 25% strength and a pH value of 7, a viscosity of 200 mPas at 25° C. results. Sufficient water and concentrated hydrochloric acid are then added that a 25% strength solution of pH 7 results (free polyalkylenepolyamine base without HCl). The viscosity is 180 mPas at 25° C.

EXAMPLE (5)

23.9 g of the polyalkylenepolyamine mixture mentioned in Example 1 and 12 g of bis-(3-aminopropyl)-methylamine, together with 30 g of water, are initially introduced into a three-neck flask. 120 g of the crosslinking agent mentioned in Example (1) are then added and the mixture is stirred at 80° C. until a viscosity of 250 mPas is reached. It is then diluted with 30 g of water and stirred at 70° C. until the viscosity reached is such that when the mixture is brought to 25% strength and a pH value of 5, a viscosity of 250 mPas at 25° C. results. Sufficient water and concentrated hydrochloric acid are then added that a 25% strength solution of pH 5 results (free polyalkylenepolyamine base without HCl). The viscosity is 240 mPas at 25° C.

EXAMPLE (6)

22 g of the polyalkylenepolyamine mixture described under (b), having a base equivalent of 44, and 60 g of water are initially introduced into a three-neck flask. 74 g of the crosslinking agent from Example 2 are then added and the mixture is stirred at 60° C. until a viscosity of 150 mPas at 60° C. is reached. The mixture is diluted with 40 g of water and stirring is continued at 60° C. until the viscosity reached is such that when the mixture is brought to 25% strength and a pH value of 4, a viscosity of about 200 mPas at 25° C. results. Sufficient water and concentrated hydrochloric acid are then added that a 25% strength solution of pH value 4 results (free polyalkylenepolyamine base without HCl). The viscosity is 190 mPas at 25° C.

EXAMPLE (7)

21.9 g of the polyalkylenepolyamine mixture described under (c), having a base equivalent of 43.8, and 50 g of water are initially introduced into a 3-neck flask. 65 g of the crosslinking agent from Example 3 are added and the mixture is stirred at 60° C. until a viscosity of 70 mPas is reached. The mixture is then diluted with 50 g of water and is stirred at 60° C. until the viscosity reached is such that when the mixture is brought to 25% strength and a pH value of 4.5 viscosity of 250 mPas results. Sufficient water and concentrated hydrochloric acid are then added that a 25% strength solution of pH value 4.5 results (free polyalkylenepolyamine base without HCl). The viscosity is 265 mPas at 25° C.

Use examples

EXAMPLE 1

Paper (about 80 g/m$^2$) was produced on a laboratory papermaking machine (Kämmerer type) from 70% of bleached coniferous sulphite cellulose and 30% of bleached beech sulphate cellulose. Some of the experiments were carried out in the acid range and others at neutral pH values:
(a) Acid range:

30% of china clay as the filler, 1% of rosin and 3% of aluminium sulphate were added to the paper pulp. The pH value was adjusted to 4.8 with sulphuric acid.
(b) Neutral range:

30% of calcium carbonate as the filler and 1% of Aquapel 360 XZ (a synthetic size based on stearyldiketene, from Messrs. Hercules Inc.) were added to the paper pulp. The pH value was adjusted to 7.8–8 with sodium hydroxide solution.

The 1% strength aqueous solutions of the 22.5% strength polyamines 1 to 7 were introduced, by means of a metering pump, before the headbox of the papermaking machine.

For comparison, the known reaction products of polyfunctional compounds with "polyamidoamines" (retention agent I: reaction products I of German Pat. No. 1,771,814) as well as with "polyalkylenepolyamines" (retention agent II: Example B of German Pat. No. 2,351,754) were metered in, again at a dilution of 1%. The solids content in the waste water of the papermaking machine was determined as a measure of the retention action. The lower this solids content, the better is the retention action.

Table 1 below shows that the polyalkylenepolyamines according to the invention in the acid range and in the neutral to weakly alkaline range surpass the activity of the known retention agents, in many cases even substantially.

The amounts added in each case relate to the weight of the air-dry cellulose and to the 25% strength solution of the retention agent.

Table 1

| Retention agent | Amount added % | Dry residue in the waste water (mg/l) | |
|---|---|---|---|
| | | (a) Acid range pH 4.8 | (b) Neutral range pH 7.8 |
| None | | 601 | 783 |
| Polyamidoamine I | 0.1 | 198 | 384 |
| Polyalkyleneamine II | " | 207 | 199 |
| Polyalkyleneamine 1 | " | 200 | 185 |
| Polyalkyleneamine 2 | " | 185 | 181 |
| Polyalkyleneamine 3 | " | 189 | 179 |
| Polyalkyleneamine 4 | " | 191 | 188 |
| Polyalkyleneamine 5 | " | 193 | 183 |
| Polyalkyleneamine 6 | " | 195 | 187 |
| Polyalkyleneamine 7 | " | 188 | 179 |

USE EXAMPLE 2

The Schopper-Riegler freeness was determined as a measure of the acceleration of drainage to be expected on an industrial papermaking machine. The more the freeness is reduced by the retention agent added, the greater is the drainage acceleration which may be expected.

A further measure of the drainage acceleration to be expected on a papermaking machine is the so-called drainage time. This is determined by measuring, in the Schopper-Riegler freeness tester, the time required to reach a particular freeness or volume of water in the drainage cup. The shorter is this time, the better is the achievable drainage acceleration.

Mixed waste paper was pulped using a high speed stirrer and the pH value was adjusted:
(a) Acid range:
  0.5% of aluminium sulphate was added and the pH was adjusted to 4.5 with sulphuric acid.
(b) Neutral range:

The pH was adjusted to 7.2 with sodium hydroxide solution.

In each case, the 1% strength solution of the retention agent was added to 200 ml of the 1% strength paper pulp suspension prepared according to (a) or (b) and then made up to 1,000 ml with water. The freeness was determined with the aid of the Schopper-Riegler instrument.

The amounts added in each case relate to the weight of the air-dry paper pulp and to the 25% strength solution of the polyamines 1 to 7.

Table 2 below illustrates the good drainage effect of the polyalkylenepolyamines according to the invention both in the acid and in the neutral range. At the same time, the known retention agents listed in Use example 1 were also added.

The tables show, in addition to the freeness, the drainage time in seconds which was required to reach a given freeness. This freeness should be slightly below the freeness of the paper pulp without addition of a retention agent.

If, for each individual product in Table 2, the overall properties in an acid medium and in a weakly alkaline medium, with 0.1% of additive and with 0.3% of additive, are regarded, it is found that the products according to the invention give better drainage acceleration than the known products.

Table 2

| Example | Additive in % | Waste paper, pH 7.5 | | Additive in % | Waste paper + 0.5% of alum + $H_2SO_4$ | |
|---|---|---|---|---|---|---|
| | | Freeness [°SR] | [sec.] at 50° SR | | Freeness [°SR] | [sec.] at 55°SR |
| Without retention agent | | 59 | | | 56 | |
| I | 0.2 | 57 | 43.5 | 0.1 | 50 | 31.9 |
| | 0.4 | 53 | 32.9 | 0.3 | 45 | 23.3 |
| II | 0.2 | 55 | 35.8 | 0.1 | 52 | 35.0 |
| | 0.4 | 45 | 20.2 | 0.3 | 47 | 25.2 |
| 1 | 0.2 | 54 | 33.2 | 0.1 | 50 | 32.3 |
| | 0.4 | 44 | 18.7 | 0.3 | 44 | 23.0 |
| 2 | 0.2 | 54 | 33.8 | 0.1 | 49 | 29.2 |
| | 0.4 | 43 | 18.7 | 0.3 | 45 | 23.5 |
| 3 | 0.2 | 54 | 32.9 | 0.1 | 49 | 29.4 |
| | 0.4 | 43 | 18.2 | 0.3 | 44 | 22.5 |
| 4 | 0.2 | 55 | 34.1 | 0.1 | 50 | 32.6 |
| | 0.4 | 46 | 20.3 | 0.3 | 46 | 24.2 |
| 5 | 0.2 | 53 | 32.1 | 0.1 | 49 | 31.6 |
| | 0.4 | 44 | 19.8 | 0.3 | 45 | 23.7 |
| 6 | 0.2 | 54 | 34.0 | 0.1 | 51 | 34.7 |
| | 0.4 | 46 | 21.0 | 0.3 | 46 | 24.6 |
| 7 | 0.2 | 53 | 32.7 | 0.1 | 50 | 32.0 |
| | 0.4 | 44 | 19.7 | 0.3 | 44 | 22.8 |

Table 2-continued

We claim:

1. Water-soluble polyalkylenepolyamines which are not self-crosslinking and contain quaternary dialkylammonium groups, and are obtained by reaction in an aqueous medium at temperatures of 0° to 100° C., at a total concentration of 10 to 60%, and at pH values above 6 of polyalkylenepolyamines of the general formula

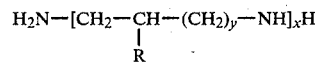

$$H_2N-[CH_2-\underset{R}{CH}-(CH_2)_y-NH]_xH$$

in which
R denotes hydrogen or methyl,
y denotes the number 0 or 1 and the y's may be identical or different and
x denotes a number from 2 to 15,
with bifunctional compounds of the general formula

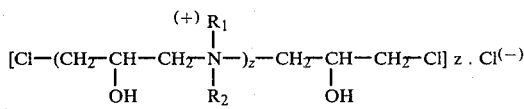

$$[Cl-(CH_2-\underset{OH}{CH}-CH_2-\overset{(+)}{\underset{R_2}{N}}-)_z-CH_2-\underset{OH}{CH}-CH_2-Cl]\,z\,.\,Cl^{(-)}$$

in which
z denotes an integer from 1 to 6 and
$R_1$ and $R_2$ denote lower alkyl or lower hydroxylalkyl, 0.1 to 0.5 mol of the bifunctional compound being employed per mol of basic nitrogen of the polyalkylenepolyamine.

2. Water-soluble polyalkylenepolyamines according to claim 1, characterised in that the polyalkylenepolyamines employed are the mixtures obtained on reaction of 1 mol of 1,2-dichloroethane with 6 to 30 mols of ammonia.

3. Water-soluble polyalkylenepolyamines according to claim 1, characterised in that the aqueous solutions of the reaction products of 1 mol of HCl, z mols of dialkylamine and (z+1) mols of epichlorohydrin, wherein z can denote from 1 to 6, are employed as the bifunctional compound.

4. Water-soluble polyalkylenepolyamines according to claim 3, characterised in that dimethylamine is employed as the dialkylamine.

5. Water-soluble polyalkylenepolyamines according to claim 1, characterised in that in the form of 10% strength aqueous solutions they have a viscosity of at least 30 mPas at 25° C.

* * * * *